Patented Oct. 13, 1925.

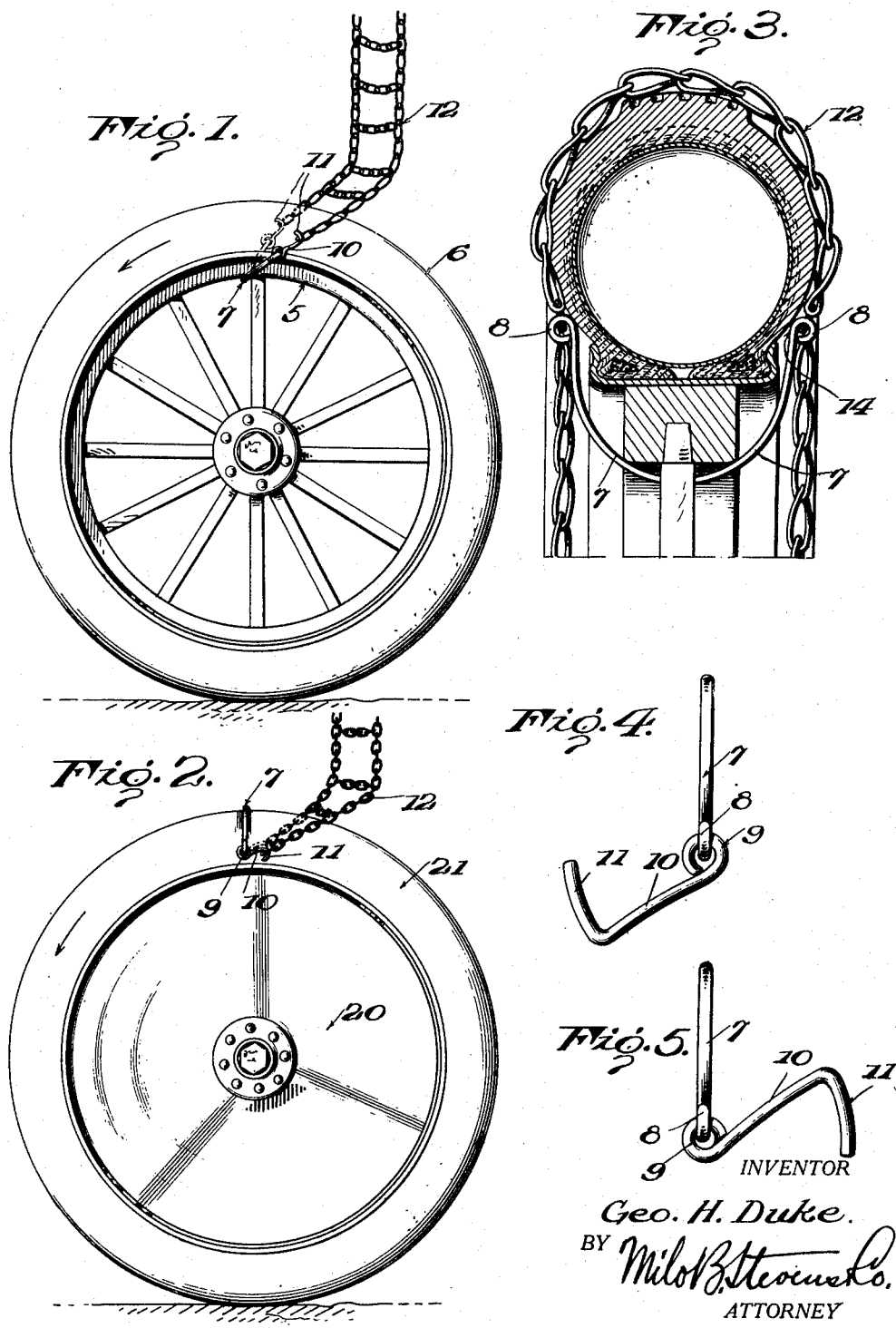

1,556,919

UNITED STATES PATENT OFFICE.

GEORGE H. DUKE, OF CHICAGO, ILLINOIS.

ATTACHING DEVICE FOR TIRE CHAINS.

Application filed April 24, 1924. Serial No. 708,803.

*To all whom it may concern:*

Be it known that I, GEORGE H. DUKE, a citizen of the United States, residing at Chicago, in the county of Cook and State of Illinois, have invented new and useful Improvements in Attaching Devices for Tire Chains, of which the following is a specification.

This invention relates to attaching devices especially adapted for use in connection with automobile tire chains.

Briefly stated an important object of this invention is to provide simple and reliable means whereby to hold one end of a tire chain in position on the crown of a tire so that the chain may be wrapped about the tire and the ends of the same connected.

A further and equally important object of the invention is to provide a chain attaching device having novel means whereby the chains may be secured about the tire without any slack or looseness therein.

Also an important aim is to provide an attaching device having simple and reliable means to straighten the chains and having means whereby the device may be quickly disconnected when desired.

Another major object is to provide a chain attaching device having means whereby the same is securely engaged with a portion of the tire and also being provided with means whereby the same may be spread when it is desired to apply or remove the device.

Other objects and advantages will be apparent during the course of the following description.

In the accompanying drawing forming a part of this application and in which like numerals are employed to designate like parts throughout the same, Figure 1 is a side elevation of the device applied to a wheel and having one end of a tire chain connected thereto preparatory to the application of the chain to the wheel.

Fig. 2 is a side elevation of the device applied to a disk wheel;

Fig. 3 is a detail sectional view through a spoke wheel illustrating the application of the device;

Fig. 4 is a side elevation of the device detached and positioned to engage end portions of the tire chain;

Fig. 5 is a similar view, the combined hook and handle being arranged in their inoperative or retracted positions.

In the drawing wherein for the purpose of illustration is shown a preferred embodiment of the invention, the numeral 5 generally designates the wheel to which a tire 6 is connected.

As illustrated in Fig. 1 the more or less U-shaped or arch shaped body 7 is extended between the spokes and the sides of the same are positioned on opposite sides of the rim of the wheel. The ends of the body 7 are formed with eyes 8 to which the eyes 9 of the combined handles and hooks 10 are connected. The hooks 10 have their outer portions formed with bills 11 adapted to be engaged with the links at one end portion of the chain 12 to hold one end of the chain in position during the application of the same to the tire.

Attention is especially directed to the fact that the bills 11 are curved longitudinally on arcs having as their axes the axes of the eyes 9. It is thus seen that when it is desired to disconnect the hooks 10 from the links of the chain it is merely necessary to turn the same by means or by a small tool and the bills will be removed from engagement with the links.

In the use of the device in connection with a spoke wheel as illustrated in Fig. 1 the arch body 7 is arranged between the spokes with the sides of the same extending toward the crown of the tire and the hooks 10 are positioned at opposite sides of the tire with the bills extended outwardly so that the links of the chain may be conveniently connected thereto. It is important to note that the hooks 10 not only function as such, but also as handles for facilitating the application of the device to the wheel. In other words the hooks 10 form convenient hand grips by means of which the arch body 7 may be spread slightly so that the terminal portions of the same may be engaged with the proper portion of the wheel. The hooks 10 also provide convenient means for spreading the end portions of the arch body 7 when it is desired to detach the device subsequent to the connecting of the tire chains to the wheel.

The eyes 8 formed at the ends of the arch shaped body define knobs or projections 14 which bear against the side walls of the tire casing and thereby hold the device in place.

The device may also be used in connection with a disk wheel 20 which is illustrated in Fig. 2 as being provided with a tire 21.

When the arch body 7 is applied to the tire 21 it is extended across the crown of the same and the projections on the end portions of the device are engaged with the sides of the tire so as to hold the device against turning about a more or less horizontal axis when the chain is drawn about the tire.

When the device is used as illustrated in Fig. 2 the bills 11 are extended inwardly and the links of the chain are connected thereto as illustrated in Fig. 2. The wheel is now turned about so that the chain is wrapped about the same and the ends of the chain are subsequently joined in the usual manner.

The body is made arch shaped so that the same will adjust itself over the inner portion of the rim either inwardly or outwardly thereby pulling the cross chains of skid chains square across the rim. In case one side of the skid chain is shorter than the other, the adjuster will move to the short side so as to equal the two sides of the chain from the main bearing of the device.

When the device is applied to the tire 21 in connection with a disk wheel the terminal portions of the main body 7 will extend beyond the greatest width of the tire and will therefore securely attach itself to the tire. This prevents the device from being pulled off by the chains being pulled around the wheel.

In operation the device is extended across the tire or the wheel felly as the case may be and one end of the skid chain is subsequently attached to the combined hooks and handles 10. The vehicle is now driven forwardly or rearwardly and the chains are drawn about the wheel until the two ends of the chains may be connected. As the chain is drawn about the tire all slack is drawn out of the chain and the chain will be tightly arranged about the tire. This is especially true with reference to that portion of the chain between the tire and the roadway.

To disengage the chain adjuster it is merely necessary to turn the combined hooks and handles on their axes and the hooks will be immediately disconnected from the chains and the device may be spread by manually gripping the hooks 10 and subsequently pulling the device from the tire.

Having thus described the invention, what is claimed is:

1. A chain attaching device comprising a bowed body having its end portions looped to form combined eyes and tire engaging knobs adapted to bear against opposite sides of a tire to hold the ends of the body in position, and combined handles and hooks having pivotal connection with said eyes.

2. A chain attaching device comprising a bowed body having its end portions looped to define combined eyes and tire engaging knobs adapted to bear against opposite sides of a tire to hold the ends of the body in position, and combined handles and hooks having pivotal connection with said eyes, said combined handles and hooks being curved longitudinally in arcs, the axes of which are at the pivotal connection of the hooks with said eyes.

In testimony whereof I affix my signature.

GEORGE H. DUKE.